US009237591B2

(12) United States Patent
Sadeghi et al.

(10) Patent No.: US 9,237,591 B2
(45) Date of Patent: Jan. 12, 2016

(54) TECHNIQUES ENABLING USE OF A WI-FI DIRECT SERVICES (WFDS) APPLICATION SERVICES PLATFORM (ASP) FOR LAYER 2 SERVICES

(71) Applicant: Intel Corporation, Santa Clara, CA (US)

(72) Inventors: Bahareh Sadeghi, Portland, OR (US); Emily H. Qi, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/125,884

(22) PCT Filed: Jul. 22, 2013

(86) PCT No.: PCT/US2013/051429
§ 371 (c)(1),
(2) Date: Dec. 12, 2013

(87) PCT Pub. No.: WO2014/171956
PCT Pub. Date: Oct. 23, 2014

(65) Prior Publication Data
US 2014/0355585 A1     Dec. 4, 2014

Related U.S. Application Data

(60) Provisional application No. 61/812,846, filed on Apr. 17, 2013, provisional application No. 61/819,078, filed on May 3, 2013, provisional application No. 61/823,980, filed on May 16, 2013.

(51) Int. Cl.
| H04W 76/02 | (2009.01) |
| H04W 80/02 | (2009.01) |
| H04W 80/04 | (2009.01) |
| H04L 29/08 | (2006.01) |
| H04L 29/12 | (2006.01) |
| H04W 8/00 | (2009.01) |
| H04W 84/12 | (2009.01) |

(52) U.S. Cl.
CPC ............ *H04W 76/023* (2013.01); *H04L 29/08* (2013.01); *H04L 29/12* (2013.01); *H04W 8/005* (2013.01); *H04W 80/02* (2013.01); *H04W 80/04* (2013.01); *H04W 84/12* (2013.01)

(58) Field of Classification Search
None
See application file for complete search history.

(56) References Cited

U.S. PATENT DOCUMENTS

2014/0201415 A1*   7/2014   Huang et al. .................. 710/303

\* cited by examiner

*Primary Examiner* — Ashley Shivers
(74) *Attorney, Agent, or Firm* — Kacvinsky Daisak Bluni PLLC (57) ABSTRACT

Techniques are disclosed for using a WI-FI Direct Services (WFDS) Application Services Platform (ASP) for Layer 2 services, by extending a definition of a session in WFDS to include non-IP sessions as well. Techniques are further disclosed for operating an application services platform coordination protocol (ASP-CP) directly over a media access control (MAC) layer.

29 Claims, 8 Drawing Sheets

TECHNIQUES ENABLING USE OF A WI-FI DIRECT SERVICES (WFDS) APPLICATION SERVICES PLATFORM (ASP) FOR LAYER 2 SERVICES

RELATED CASES

This application claims priority to the following United States Provisional Patent Applications:

61/812,846, filed on 17 Apr. 2013, entitled TECHNIQUES ENABLING USE OF A WI-FI DIRECT SERVICES (WFDS) APPLICATION SERVICES PLATFORM (ASP) FOR LAYER 2 SERVICES;

61/819,078, filed on 3 May 2013, entitled TECHNIQUES ENABLING USE OF A WI-FI DIRECT SERVICES (WFDS) APPLICATION SERVICES PLATFORM (ASP) FOR LAYER 2 SERVICES; and 61/823,980 filed on 16 May 2013, entitled METHODS TO PORT THE WI-FI DIRECT SERVICES ASP FOR OPERATION DIRECTLY OVER THE MAC.

BACKGROUND

With the increased popularity of Wi-Fi networks for wireless connectivity, there are new services being developed that use the underlying Wi-Fi links for peripheral connectivity, for example Wi-Fi Serial Bus (WSB) which enables support of USB traffic over Wi-Fi links and allows a WSB host to connect to Wi-Fi enabled USB devices/functions (WSB peripherals) wirelessly and to legacy USB devices/functions via a Wi-Fi enabled USB hub (WSB Hub).

Wi-Fi Direct provides peer-to-peer connectivity to allow users to connect their devices in an easy and convenient manner to share, show, print, and synchronize content. However, Wi-Fi Direct only provides link-layer connectivity. Wi-Fi Direct is not enough to enable interoperability between services/applications from multiple vendors. Users have inconsistent experiences due to lack of services interoperability and complexity of P2P topology.

Thus, there are general needs for improved techniques using Wi-Fi links for peripheral connectivity and general needs for improved techniques to improve service interoperability and decrease P2P topology complexity for Wi-Fi Direct.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION

In the following description, numerous specific details are set forth. However, it is understood that embodiments of the invention may be practiced without these specific details. In other instances, well-known methods, structures and techniques have not been shown in detail in order not to obscure an understanding of this description.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11 task group ac (TGac) ("IEEE802.11-09/0308r12—TGac Channel Model Addendum Document"); IEEE 802.11 task group ad (TGad) (IEEE P802.11ad Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band)) and/or future versions and/or derivatives thereof, devices and/or networks operating in accordance with existing WirelessHD™ specifications and/or future versions and/or derivatives thereof, units and/or devices which are part of the above networks, and the like.

Figure 1:
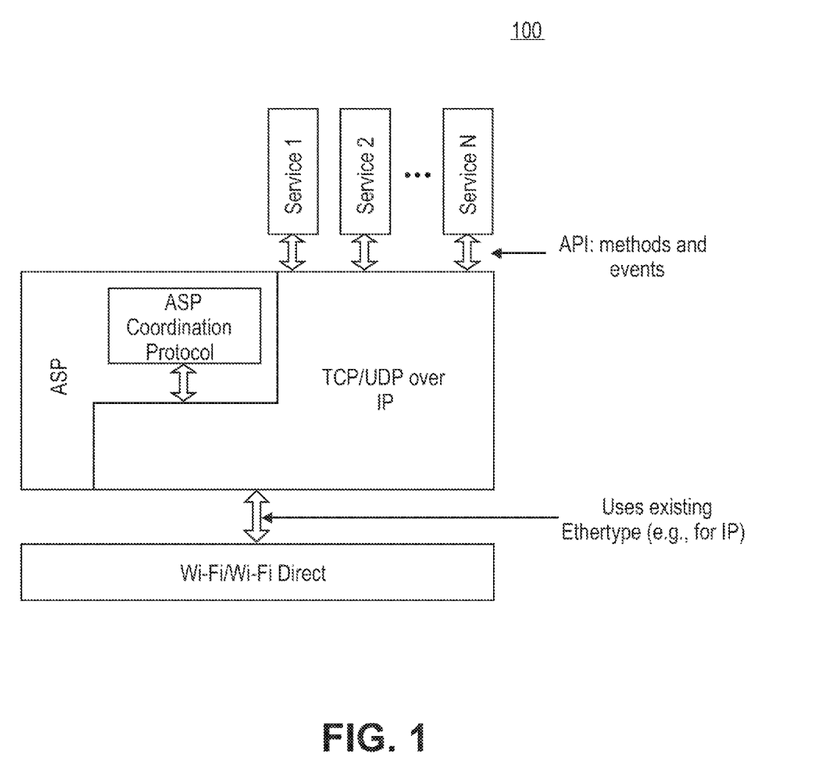
FIG. 1 illustrates a WFDS protocol architecture.

To address the problems set forth above, WFA formed the Wi-Fi Direct Services (WFDS) task group (TG). WFDS is tasked with defining a common set of application programming interfaces (APIs) and protocols enabling service interoperability. FIG. 1, shown generally as 100, depicts the architecture of the WFDS specification. The ASP coordination protocol (ASP-CP) is assumed to run over IP The core component of the WFDS specification is the definition of the Application Service Platform (ASP). ASP is a logical entity that implements the common functions needed by application services such as play, send, display and print. Within the ASP, different protocol elements are defined to realize device discovery, service discovery, P2P connection management and session management. Among those, the ASP coordination protocol (ASP-CP) is the name given to the protocol that allows two peer ASP entities to manage ASP-sessions. FIG. 1 describes where the ASP-CP lies in the WFDS architecture.

Presently, the WFDS specification defines the use of the ASP-CP over IP only. Essentially, this requirement imposes that all devices compliant with the WFDS specification must be capable of supporting an IP stack and associated management functions. While this might not be considered a difficult requirement to meet for devices such as phones, laptops, TV sets, to name a few, it does pose a challenge for a range of new device categories characterized by:

High date rates: for interfaces that operate at very high bit rates (e.g., >3 Gbps in 60 GHz), generation and processing of IP packets could become a bottleneck in terms of efficiency and latency.

Lower complexity devices: requiring IP support from very low complexity devices such as wireless keyboards, wireless mouse, to name a few, is often an overkill and can lead to higher cost and power consumption.

Type of services: certain services do not inherently need or use IP for their operation with cables. Examples include USB, HDMI and DisplayPort (DP). Therefore, as these protocols become wireless, reusing the same architecture which does not rely on IP is a suitable approach.

As a result of the above, there has been an increasing demand in the industry to extend WFDS, particularly ASP-CP, to operate directly over the MAC. In the process of doing that, this should enable services (such as shown in FIG. 1) to also operate directly over the MAC.

Examples herein provide apparatus, systems and methods that would allow the ASP-CP and services to operate directly over the MAC (i.e., without using IP). In these examples, there are some key aspects that need to be taken into account given that IP is no longer present, namely:

Traffic identification: each service and WFDS messages need to be uniquely identified so that packets can be routed to the proper process. Therefore, packets transferred between the MAC and upper layers need to identify the traffic type.

Scalability: the methods should be scalable so that they can be used not only for services presently defined, but also for future services.

Service isolation: due to aspects such as security, service isolation should be an important goal to be achieved. This refers to the capability to isolate one service from another, so that security risks can be minimized.

Figure 2:
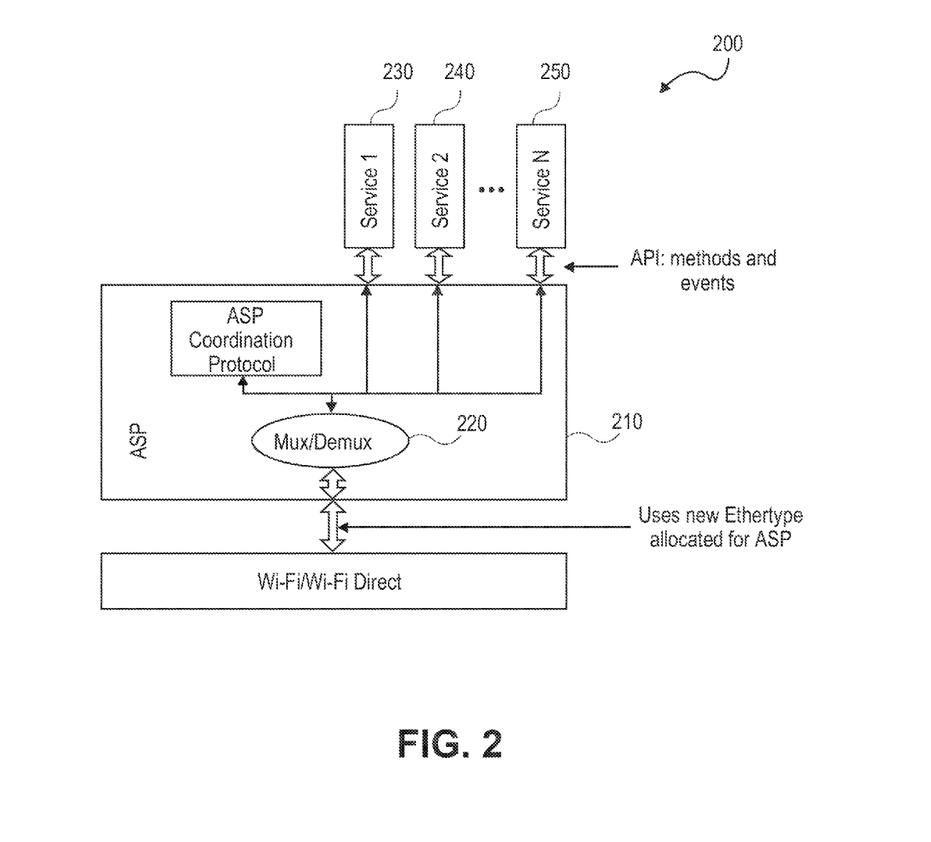
FIG. 2 illustrates an ASP managing the mux/demux of services.

Example method 1 is shown in FIG. 2, shown generally as 200. In this approach, the ASP 210 is responsible for mux/demux 210 of ASP traffic as well as traffic belonging to any service 230, 240 and 250 operating using the ASP. One Ethertype is shared across ASP and services and may support service isolation.

This implies that the ASP is responsible for tagging (e.g., through service identifiers) packets belonging to each service 230, 240 and 250 and ASP 210 in a uniquely identified manner. As a result, packets can be routed to the appropriate end point, whether that is a specific service or the ASP protocol itself.

To use this method, the ASP 210 needs to be allocated a new EtherType. EtherType is a two-octet field in an Ethernet frame. It is used to indicate which protocol is encapsulated in the payload of an Ethernet Frame. Every service 230, 240 and 250 using the ASP 210 and the ASP protocol itself (see FIG. 1) would use the same Ethertype for transmitting to and receiving from the MAC.

This architecture can provide for service isolation and scalability. Service isolation is supported given that the ASP can manage the identification of the various services 230, 240 and 250 in a dynamic manner. Such dynamicity would increase the level of security. Moreover, new services can be added over time without changes to the architecture, which makes it scalable.

Finally, since the ASP can dynamically change the identification associated with services 230, 240 and 250, this method requires that a service seeker and a service advertiser exchange service identifiers before transmitting or receiving service data. This is needed so that packets are routed to the correct end point upon reception.

Figure 3:
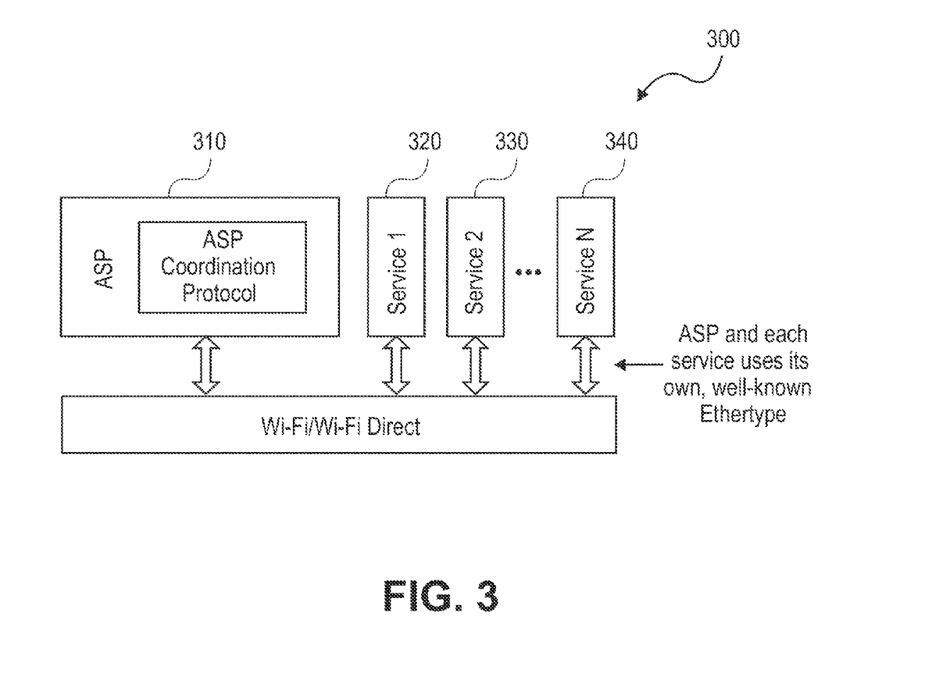
FIG. 3 illustrates an ASP and each service having a well-known Ethertype

The downside of method 1 is that it increases the complexity of the ASP 210 and makes the delivery of a service dependent on the ASP 210. Method 2 proposes a decentralized architecture, whereby each service interacts directly with the bottom MAC layer. This is depicted in FIG. 3. In FIG. 3, an ASP 310 and each service have a well-known Ethertype. In an example herein, the number of Ethertypes may be proportional to the number of services and, in an example herein, does not support service isolation.

In this method, not only the ASP traffic is identified by an Ethertype (like in method 1), but also each service has its own Ethertype. Therefore, the number of Ethertypes implied by this method is proportional to the number of services.

Method 2 provides stronger support for scalability since service delivery does not rely solely on the ASP. Each service can be independently enabled over the MAC. With respect to service isolation, method 2 does not provide the same level of isolation as method 1, since the Ethertypes are well-known identifications which allows devices to attempt to access/use a service before obtaining the proper authorization from the ASP.

Figure 4:
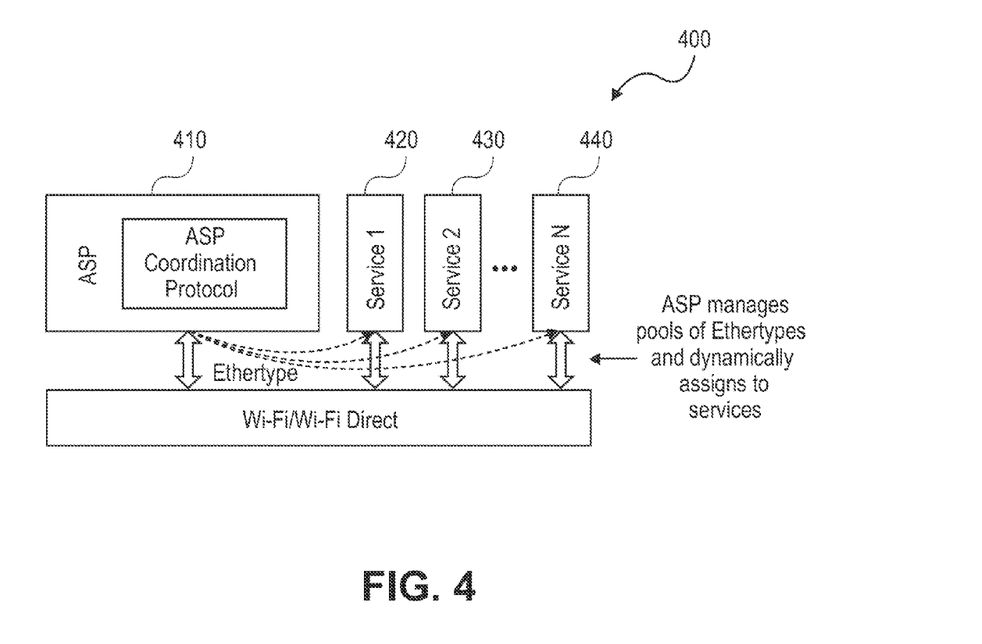
FIG. 4 illustrates an ASP dynamically allocating an EtherType to a service when needed.

Method 3, shown in FIG. 4, generally as 400i, improves the service isolation of method 2 by having the ASP 410 dynamically assign the Ethertype used by each service. This may support service isolation. Specifically, the ASP 410 manages a pool of Ethertypes. Once a service becomes in use, the ASP assigns an Ethertype to that particular service 420, 430 and 440. Over the lifetime of a service, it can use different Ethertypes assigned by the ASP.

Moreover, due to the dynamic allocation of Ethertypes, this requires that a service seeker and a service advertiser exchange Ethertypes before transmitting or receiving service data. This is needed so that packets are routed to the correct end point upon reception. Method 3 relies on the fact that the ASP 410 manages a pool of Ethertypes and dynamically assigns them to services 420, 430 and 440.

Figure 5:
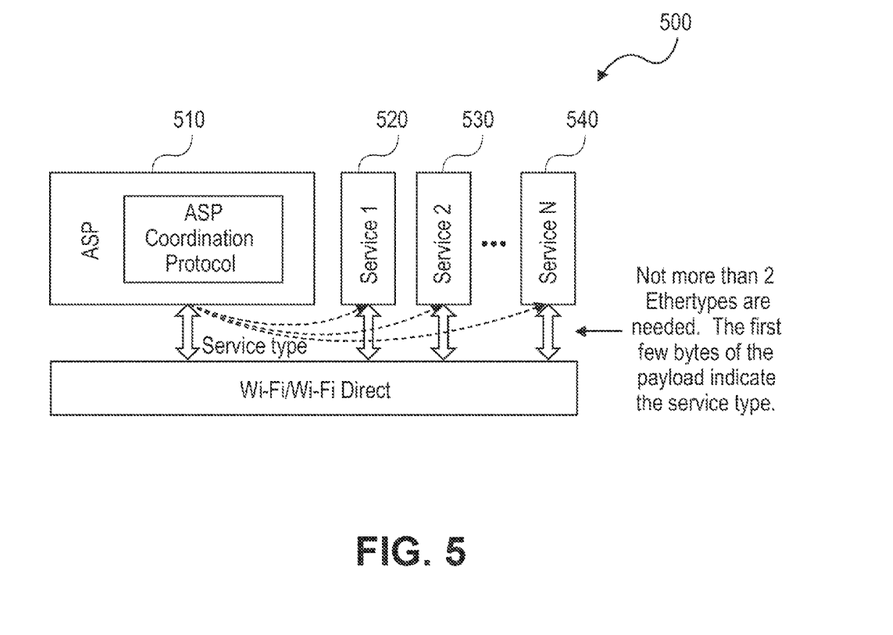
FIG. 5 illustrates an ASP dynamically allocating a service type identifier to a service when needed.

Method 4 is an alternative approach shown in FIG. 5 at 500 that does not require formal allocation of Ethertypes (which is done through the IEEE) is by defining a frame structure that allows the ASP 510 to configure a Service ID for each service 520, 530 and 540 within the frame itself.

Figure 6:
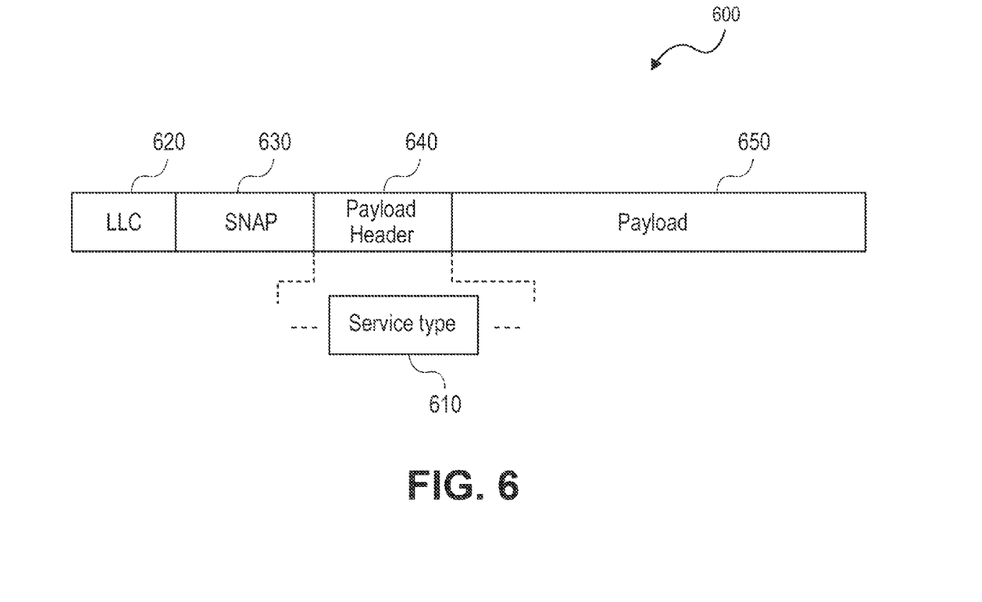
FIG. 6 illustrates a Packet structure wherein the Payload Header field signals the specific service.

In method 4, one Ethertype is allocated for the ASP 510. The services can either use the same Ethertype as ASP 510 or use a separate Ethertype that can be used by all services 520, 530 and 540. In either case, means are necessary to uniquely identify the service so that packets can be routed to the appropriate service. For that, examples herein define a new Service type field 610 that is part of the payload 650 of the frame as shown in FIG. 6. In this Packet structure, the Payload Header field 640 signals the specific service. LLC field and SNAP field are shown as 620 and 630 respectively. The payload 650 carries data associated with the service. As opposed to method 3, where the ASP would configure Ethertypes, in the case of FIG. 6, the ASP 510 would dynamically configure values of Service types to be used by the various services. Once a Service type value is assigned, all the packets belonging to that service use the assigned Service type value.

The ASP 510 can dynamically change the Service type value used by a service. This provides for enhanced security and service isolation. The length of the Service type field 610 depends on how many services are supported, but can be as short as one octet. Finally, similar to method 3, due to the dynamic allocation of Service type values, this requires that a service seeker and a service advertiser exchange Service type values before transmitting or receiving service data. This is needed so that packets are routed to the correct end point upon reception.

It is important to highlight the difference between method 1 and method 4. In method 4, a packet using the "Services" Ethertype can be delivered either to all services (and each service would then drop the packet if it does not match the intended Service type) or to a mux/demux function that would do the forwarding to the correct service. In method 1, on the other hand, ASP becomes a layer that sits above the MAC and below the Service on the data path.

With increased popularity of Wi-Fi networks for wireless connectivity, there are new services being developed that use the underlying Wi-Fi links for peripheral connectivity, for example Wi-Fi Serial Bus (WSB) which enables support of USB traffic over Wi-Fi links and allows a WSB host to connect to Wi-Fi enabled USB devices/functions (WSB peripherals) wirelessly and to legacy USB devices/functions via a Wi-Fi enabled USB hub (WSB Hub). WSB defines two modes of operation: Native mode, in which the WSB directly interfaces with the MAC; and the IP-mode, in which the WSB traffic is encapsulated as IP-traffic before being sent to the MAC. WSB relies on Wi-Fi Direct (P2P technology) as an enabling technology for discovery of devices that are WSB capable.

Wi-Fi Direct Services (WFDS) is a technology that defines an interoperability framework for service discovery and session management for services that use Wi-Fi Direct. However, WFDS as defined is not applicable to WSB for two main reasons:

1) The Service Name components defined do not include WSB; and

2) The connection and service sessions are limited to IP sessions.

Embodiments herein address the connection and service sessions that are limited to IP sessions by extending the definition of session in WFDS to include non-IP sessions as well.

Embodiments herein extend the definition of connection and session in WFDS framework to include non-IP sessions. WFDS defines Application Services Platform (ASP) as a logical entity which is, among other things, responsible for session management for different services. However, the ASP session itself and the application services sessions are established over TCP/IP connections.

Figure 7:
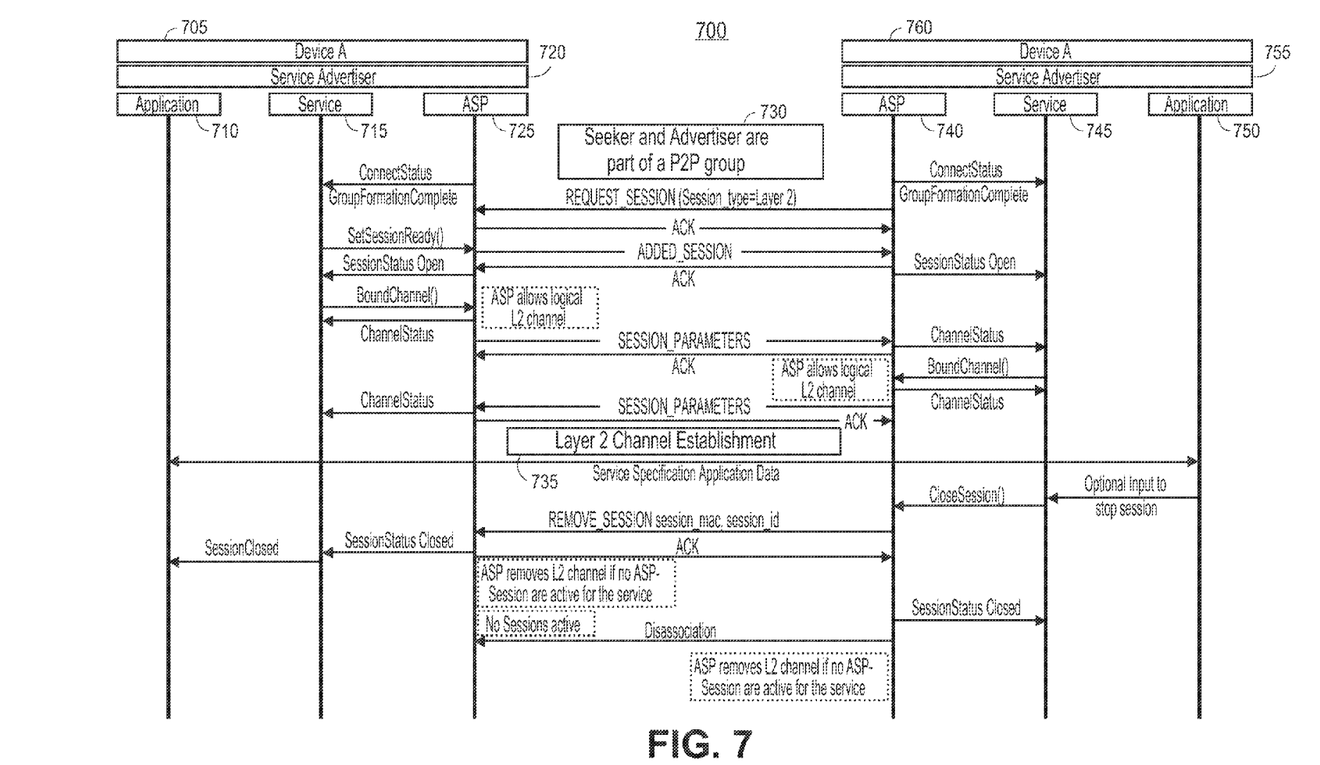
FIG. 7 illustrates the procedure for a Layer 2 services establishment.

FIG. 7, shown generally as 700, illustrates an embodiment of the procedure for a Layer 2 service establishment between Device A, 720 and Device B 760 with an embodiment of the direction commands and responses illustrated therebetween. Device A 720 is shown as service advertiser 705 including application 710, service 715 and ASP 725. Device B 760 is illustrated as service seeker 755 with ASP 740, service 745 and application 750. As illustrated at 765, seeker 755 and advertiser 705 may be part of a P2P group. 735 illustrates a layer 2 channel establishment.

Embodiments herein:

1) Extend the definition of an ASP session to be a logical session established over either a Layer 2 735 or an IP connection between a seeker 755 and an advertiser 705. An ASP session would be established over an IP connection if both devices A 720 and B 760 support IP and established over layer 2 otherwise; for example if the advertiser 705 is a non-IP Wi-Fi device like a Wi-Fi mouse which does not support an IP stack.

2) Define the Layer 2 ASP coordination protocol.

3) For IP services, for example WSB IP-mode, embodiments define ASP Service session as either a TCP or a UDP connection. Whether the TCP or UDP is used is identified by the proto parameter in the ALLOWED_PORT message defined in WFDS.

4) For non-IP Services, like native-mode WSB, embodiments define ASP Service session exclusively as a logical channel over a Layer 2 connection. The characteristics/parameters associated with this Layer 2 channel can be negotiated using the ASP Coordination Protocol (which itself can be running either as an IP or non-IP session, [i.e., Layer 2 session]). If the ASP Coordination Protocol runs over an IP session, then the mechanism for establishing a non-IP service session is as follows:

A new field is defined to be added in the REQUEST_SESSION message defined in WFDS to identify the session type. This new field is called "session_type" field and can take at least two values, indicating whether the requested session is to be established over IP or over Layer 2. For example, the definition of REQUEST_SESSION in WFDS can be modified as below to accommodate the new subfield. It is noted that the field can be located differently, with a different length and the mapping of the values to the session types may be different from the example below.

"REQUEST_SESSION:

a. Format of REQUEST_SESSION message is shown in Table 1.

b. Service Seeker ASP 740 requests a new ASP-Session for the advertised advertisement_id to Service Advertiser ASP 725.

c. The Service Advertiser which is recipient of this command shall send ADDED_SESSION or REJECTED_SESSION message within <TBD> seconds after receiving a REQUEST_SESSION message. Failure to receive a response shall trigger a SessionStatus with Closed status Event at the requestor (Service Seeker) end.

TABLE 1

Format of REQUEST_SESSION message

| Field | Size (octets) | Value | Description |
|---|---|---|---|
| Opcode | 1 | 0x00 | Opcode as defined in Error! Reference source not found.. |
| Sequence number | 1 | Variable | Sequence number is assigned at transmission time. |

TABLE 1-continued

Format of REQUEST_SESSION message

| Field | Size (octets) | Value | Description |
|---|---|---|---|
| session_mac | 6 | Variable | MAC address used in combination with the session_id to uniquely identify an ASP-Session. |
| session_id | 4 | Variable | ID used in combination with session_mac to uniquely identify an ASP-Session. Assigned by the ASP sending this message. |
| Session type | 1 | Variable | Identifies whether the session is a Layer 2 session or an IP session. 0x000: IP Session 0x001: Layer 2 Session |
| advertisement_id | 4 | Variable | ID referencing a Service Advertised by the recipient of this message. |
| session_information_length | 1 | Variable (0-144) | Length of the session_information field (number of octets) |
| session_information | Variable (0-144) | Variable | session_information data if received in the ConnectSessions method. |

Layer 2 ASP coordination protocol.

The ASP coordination protocol defined in WFDS consists of commands and responses (either ACK or NACK) that are sent in form of a single UDP datagram. In Layer 2 ASP coordination protocol, each of these commands are sent as ASP Session Action frame, an IEEE 802.11 Action Frame. The retry mechanisms associated with 802.11 Action Frame apply to ASP coordination protocol.

Table 2 below provides an embodiment of a general format of ASP Session Action Frame. The format of ASP Session Action frame is defined as:

TABLE 2

General Format of ASP Session Action Frame

| Field | Size (octets) | Value | Description |
|---|---|---|---|
| Opcode | 1 | 0x00 | Opcode as defined in Error! Reference source not found.. |
| Sequence number | 1 | Variable | Sequence number is assigned at transmission time. |
| session_mac | 6 | Variable | MAC address used in combination with the session_id to uniquely identify an ASP-Session. |
| session_id | 4 | Variable | ID used in combination with session_mac to uniquely identify an ASP-Session. Assigned by the ASP sending this message. |
| Session type | 1 | Variable | Identifies whether the session is a Layer 2 session or an IP session. 0x000: IP Session 0x001: Layer 2 Session |
| advertisement_id | 4 | Variable | ID referencing a Service Advertised by the recipient of this message. |
| session_information_length | 1 | Variable (0-144) | Length of the session_information field (number of octets) |
| session_information | Variable (0-144) | Variable | session_information data if received in the ConnectSessions method. |

A Layer 2 session is established as a "logical channel" carrying the data related to the specific service between the seeker 755 and the advertiser 705. This "logical channel" may be identified by different parameters, specifically related to Layer 2; one example may be the parameters in the TSPEC element (defined in IEEE 802.11 standard).

In order to enable the devices to establish the layer 2 "logical channel" we define the ASP coordination protocol message below which is used to communicate the information regarding the logical channel between the seeker and the advertiser: SESSION_PARAMETERS:

Format of SESSION_PARAMETERS message is shown below.

Sent by an ASP when a specific logical channel (may be identified by TSPEC element or other MAC parameters) is intended for use on a specific session. This includes the initial Service logical channel as well as logical channels added to the session later.

Figure 8:
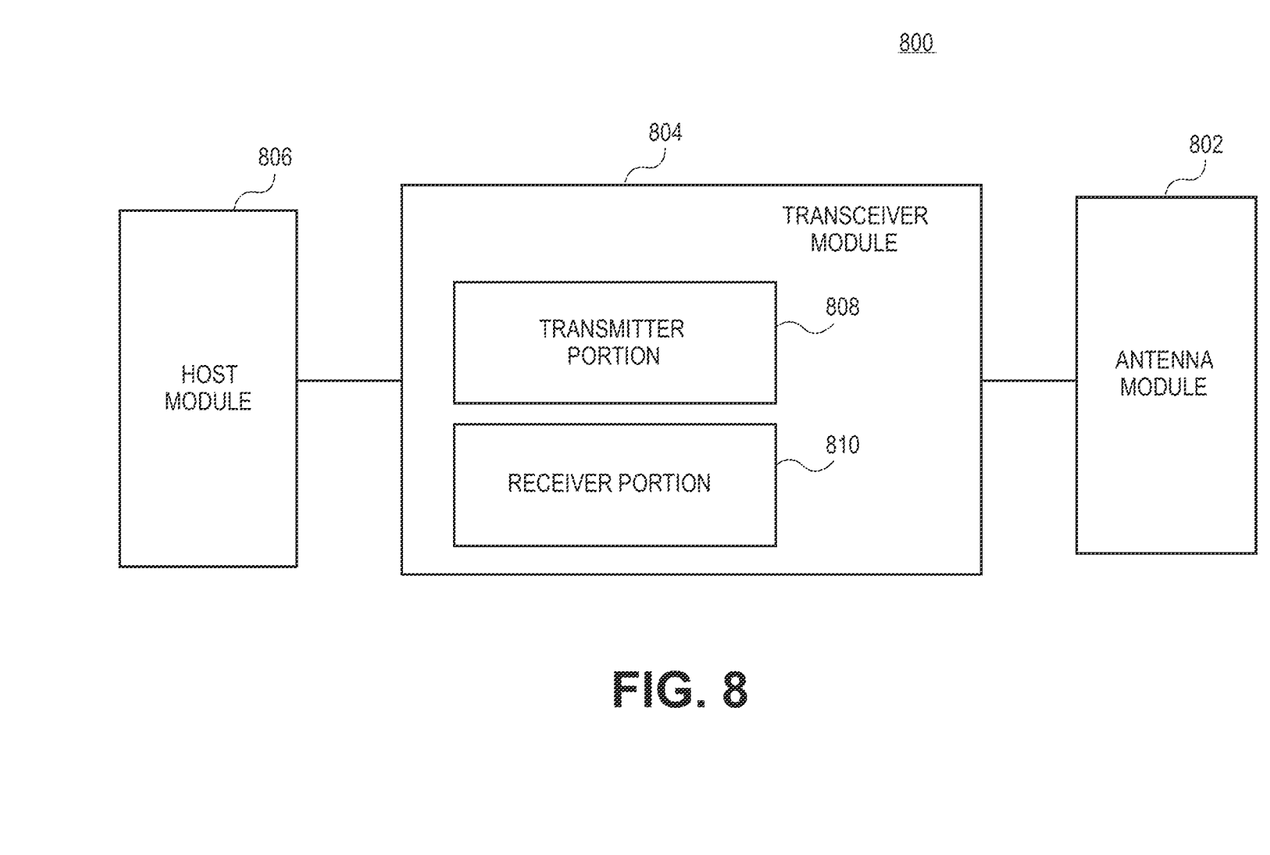
FIG. 8 is a diagram of an exemplary wireless communications device.

L2 channel parameters: any parameters used to specify/identify the logical layer 2 channel, may No return value
ChannelStatus (session_mac, session_id, L2 channel parameters, status)
    session_mac: Any string, integer, byte array, or other format adequate to uniquely represent an IEEE EUI-48 identifier
    session_id: Unsigned 32-bit integer
    L2 channel parameters: any parameters used to specify/identify the logical layer 2 channel, may status: No specific type required FIG. 8 is a diagram of an implementation 800 that may be included in a wireless devices, which may be a STA and/or an access point or Wi-Fi enabled devices that may utilize the examples shown herein. Device 800 may perform techniques, as described herein, such as techniques enabling the application services platform coordination protocol (ASP-CP) and services to operate directly over the MAC and such as tech-

| Field | Size (octets) | Value | Description |
|---|---|---|---|
| Category | 1 | Indicating Action | |
| Action | 1 | Indicating ASP Coordination Protocol | |
| Opcode | 1 | 0x04 | Opcode as defined above |
| Sequence number | 1 | variable | Sequence number is assigned at transmission time. |
| session_mac | 6 | Variable | MAC address used in combination with the session_id to uniquely identify an ASP-Session. |
| session_id | 4 | Variable | ID used in combination with session_mac to uniquely identify an ASP-Session. This value is received/transmitted in a previous REQUEST_SESSION message |
| L2 logical channel Parameters, e.g., TSPEC element | 52 in case of TSPEC element. | Variable | TSPEC element as defined in IEEE 802.11 or other parameters. |

Additionally, an embodiment defines two new ASP Methods and an ASP Event to bind and release the Level 2 logical channel to the layer 2 service and to carry the information regarding the status of the logical channel:

BoundSession (session_mac, session_id, ip_address, L2 channel parameters)
    session_mac: Any string, integer, byte array, or other format adequate to uniquely represent an IEEE EUI-48 identifier;
    session_id: Unsigned 32-bit integer;
    ip_address: ip_address must be a string, integer, byte array, or other format adequate to uniquely represent IP addresses used on the platform, including IPv4 and, if applicable, IPv6;
    L2 channel parameters: any parameters used to specify/identify the logical layer 2 channel, may be TSPEC element as defined in IEEE 802.11
Returns error code: No specific type required
ReleasePort (session_mac, session_id, ip_address, L2 channel parameters)
    session_mac: Any string, integer, byte array, or other format adequate to uniquely represent an IEEE EUI-48 identifier
    session_id: Unsigned 32-bit integer
    ip_address: ip_address must be a string, integer, byte array, or other format adequate to uniquely represent IP addresses used on the platform, including IPv4 and, if applicable, IPv6.

niques for using a WI-FI Direct Services (WFDS) Application Services Platform (ASP) for Layer 2 services by extending a definition of a session in WFDS to include non-IP sessions as well. As shown in FIG. 8, implementation 800 may include an antenna module 802, a transceiver module 804, and a host module 806. These elements may be implemented in hardware, software, or any combination thereof.

Antenna module 802 provides for the exchange of wireless signals with remote devices. Moreover, antenna module 802 may transmit wireless signals through one or more directional radiation patterns. Thus, antenna module 802 may include multiple antennas and/or multiple radiating elements (e.g., phased-array radiating elements).

Transceiver module 804 provides an interface between antenna module 802 and host module 806. For instance, transmitter portion 808 within transceiver module 804 receives symbols from host module 806 and generates corresponding signals for wireless transmission by antenna module 802. This may involve operations, such as modulation, amplification, and/or filtering. However, other operations may be employed.

Conversely, receiver portion 810 within transceiver module 804 obtains signals received by antenna module 802 and generates corresponding symbols. In turn, receiver portion 810 provides symbols to host module 806. This generation of symbols may involve operations, including (but not limited to) demodulation, amplification, and/or filtering.

The symbols exchanged between host module 806 and transceiver module 804 may form messages or information associated with one or more protocols, and/or one or more user applications. Thus, host module 806 may perform operations corresponding to such protocol(s) and/or user application(s). Further, exemplary protocols include various media access, network, transport and/or session layer protocols. Exemplary user applications include telephony, messaging, e-mail, web browsing, content (e.g., video and audio) distribution/reception, and so forth.

In addition, host module 806 may exchange control information with transceiver module 804. This control information may pertain to the operation and status of transceiver module 804. For instance, this control information may include directives that host module 806 sends to transceiver module 804. Such directives may establish operating parameters/characteristics for transceiver module 804. Also, this control information may include data (e.g., operational status information) that host module 806 receives from transceiver module 204. It may further incorporate commands and messages that as enable the application services platform coordination protocol (ASP-CP) and services to operate directly over the MAC and enable using a WI-FI Direct Services (WFDS) Application Services Platform (ASP) for Layer 2 services by extending a definition of a session in WFDS to include non-IP sessions as well.

As described above, transmitter portion 808 generates signals from symbols, and receiver portion 810 generates symbols from received signals. To provide such features, transmitter portion 808 and receiver portion 810 may each include various components, such as modulators, demodulators, amplifiers, filters, buffers, upconverters, and/or downconverters. Such components may be implemented in hardware (e.g., electronics), software, or any combination thereof.

The techniques described herein may be embodied in a computer-readable medium for configuring a computing system to execute the method. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and data transmission media including permanent and intermittent computer networks, point-to-point telecommunication equipment, carrier wave transmission media, the Internet, just to name a few. Other new and various types of computer-readable media may be used to store and/or transmit the software modules discussed herein. Computing systems may be found in many forms including but not limited to mainframes, minicomputers, servers, workstations, personal computers, notepads, personal digital assistants, various wireless devices and embedded systems, just to name a few. A typical computing system includes at least one processing unit, associated memory and a number of input/output (I/O) devices. A computing system processes information according to a program and produces resultant output information via I/O devices.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

The invention claimed is:

1. A wireless device operable to use Wi-Fi links for peripheral connectivity, comprising:
   a host module configured to establish a services session and use a Wi-Fi Direct Services (WFDS) Application Services Platform (ASP) for Layer 2 services by extending a definition of the services session in WFDS to include non-IP sessions, the definition of the services session extended by defining a new field in a REQUEST_SESSION message defined in WFDS to identify a session type; and
   a transceiver interfaced with the host module to transmit and receive signals including those consistent with a WFDS framework.

2. The wireless device of claim 1, wherein the new field takes at least two values, indicating whether the requested session is to be established over IP or over Layer 2.

3. The wireless device of claim 2, wherein the wireless device is configured to be a seeker or an advertiser and wherein the host module uses a WFDS ASP that further defines an ASP coordination protocol message to communicate information regarding a logical channel between a seeker and an advertiser.

4. The wireless device of claim 3, wherein the host module uses a WFDS ASP that further defines two ASP Methods and an ASP Event to bind and release a Level 2 logical channel to a layer 2 service and to carry information regarding a status of the logical channel.

5. The wireless device of claim 1, wherein the peripheral operates using a Wi-Fi Serial Bus (WSB).

6. The wireless device of claim 1, further comprising:
   an antenna module interfaced with the transceiver to provides for the exchange of wireless signals with remote devices.

7. A method of using Wi-Fi links for peripheral connectivity, comprising:
   establishing a services session; and
   using a Wi-Fi Direct Services (WFDS) Application Services Platform (ASP) for Layer 2 services by extending a definition of the session in WFDS to include non-IP sessions, the definition of the services session extended by defining a new field in a REQUEST_SESSION message defined in WFDS to identify a session type.

8. The method of claim 7, wherein the new field takes at least two values, indicating whether the requested session is to be established over IP or over Layer 2.

9. The method of claim 8, further comprising using a WFDS ASP that further defines an ASP coordination protocol message to communicate information regarding a logical channel between a seeker and an advertiser.

10. The method of claim 9, further comprising further defining two ASP Methods and an ASP Event to bind and release a Level 2 logical channel to a layer 2 service and to carry information regarding a status of the logical channel.

11. The method of claim 7, further comprising operating the wireless device using a Wi-Fi Serial Bus (WSB).

12. At least one non-transitory computer-readable medium storing instructions, that when executed cause one or more processors to:
    establish a services session; and
    use Wi-Fi links for peripheral connectivity using a Wi-Fi Direct Services (WFDS) Application Services Platform (ASP) for Layer 2 services by extending a definition of the services session in WFDS to include non-IP sessions, the definition of the services session extended by defining a new field in a REQUEST_SESSION message defined in WFDS to identify a session type.

13. The at least one non-transitory computer-readable medium of claim 12, wherein the new field takes at least two values, indicating whether the requested session is to be established over IP or over Layer 2.

14. The at least one non-transitory computer-readable medium of claim 13, further comprising instructions that when executed cause the one or more processors to use a WFDS ASP that further defines an ASP coordination protocol message to communicate information regarding a logical channel between a seeker and an advertiser.

15. The at least one non-transitory computer-readable medium of claim 14, further comprising instructions that when executed cause the one or more processors to define two ASP Methods and an ASP Event to bind and release a Level 2 logical channel to a layer 2 service and to carry information regarding a status of the logical channel.

16. The at least one non-transitory computer-readable medium of claim 12, further comprising instructions that when executed cause the one or more processors to operate the wireless device using a Wi-Fi Serial Bus (WSB).

17. The at least one non-transitory computer-readable medium of claim 16, further comprising instructions that when executed cause the one or more processors to establish an ASP session over an IP connection if all devices being connected support IP and establishing an ASP session over layer 2 otherwise.

18. A method, comprising:
    operating an application services platform coordination protocol (ASP-CP) directly over a media access control (MAC) layer;
    allocating a new EtherType for the application services platform (ASP);
    communicating traffic using Wi-Fi direct with at least some of the traffic communicated in accordance with the ASP-CP;
    performing mux/demux of ASP traffic and other traffic belonging to any service operating using the ASP.

19. The method of claim 18, further comprising using a decentralized architecture, whereby each service interacts directly with a bottom MAC layer.

20. The method of claim 19, further comprising having the ASP dynamically assign the Ethertype used by each service.

21. The method of claim 18, further comprising defining a frame structure that allows the ASP to configure a Service ID for each service within the frame itself.

22. The method of claim 21, further comprising defining a new Service type field that is part of a payload of the frame.

23. The method of claim 22, further comprising dynamically configuring by the ASP values of Service types to be used by various services and once a Service type value is assigned, all packets belonging to that service use an assigned Service type value.

24. A wireless device, comprising:
    a host module configured to operate an application services platform coordination protocol (ASP-CP) directly over a media access control (MAC) layer and allocate a new EtherType for the application services platform (ASP); and
    a transceiver interfaced with the host module to communicate traffic using Wi-Fi direct with at least some of the traffic communicated in accordance with the ASP-CP,
    the host module to perform mux/demux of ASP traffic and other traffic belonging to any service operating using the ASP.

25. The wireless device of claim 24, wherein said wireless device uses a decentralized architecture, whereby each service interacts directly with a bottom MAC layer.

26. The wireless device of claim 25, wherein the ASP dynamically assigns the Ethertype used by each service.

27. The wireless device of claim 24, wherein the wireless device is configured to define a frame structure that allows the ASP to configure a Service ID for each service within the frame itself.

28. The wireless device of claim 27, wherein the wireless device is configured to define a new Service type field that is part of a payload of the frame.

29. The wireless device of claim 28, wherein the wireless device is configured to dynamically configure by the ASP values of Service types to be used by various services and once a Service type value is assigned, all packets belonging to that service use an assigned Service type value.

* * * * *